United States Patent
Brueckheimer et al.

[11] Patent Number: 5,894,477
[45] Date of Patent: Apr. 13, 1999

[54] COMMUNICATIONS SYSTEM

[75] Inventors: Simon Daniel Brueckheimer, London; Roy Harold Mauger, Radlett, both of United Kingdom

[73] Assignee: Northern Telecom Limited, Montreal, Canada

[21] Appl. No.: 08/737,817
[22] PCT Filed: May 19, 1995
[86] PCT No.: PCT/GB95/01133
§ 371 Date: Feb. 28, 1997
§ 102(e) Date: Feb. 28, 1997
[87] PCT Pub. No.: WO95/32596
PCT Pub. Date: Nov. 30, 1995

[30] Foreign Application Priority Data

May 21, 1994 [GB] United Kingdom ............... 9410295

[51] Int. Cl.[6] .............................................. H04L 12/56
[52] U.S. Cl. .......................... 370/353; 370/420; 370/429; 370/465
[58] Field of Search ........................... 370/395, 396, 370/397, 398, 399, 400, 401, 419, 420, 465, 466, 469, 353, 429

[56] References Cited

U.S. PATENT DOCUMENTS

| | | | |
|---|---|---|---|
| 5,490,140 | 2/1996 | Abensour et al. | 370/419 |
| 5,583,863 | 12/1996 | Darr, Jr. et al. | 370/397 |
| 5,623,491 | 4/1997 | Skoog | 370/466 |

*Primary Examiner*—Min Jung
*Attorney, Agent, or Firm*—Lee, Mann, Smith, McWilliams, Sweeney & Ohlson

[57] ABSTRACT

An integrated broadband and narrowband access arrangement, includes a multiplexed ATM adapter and an ATM core. The ATM core terminates a broadband access system and a narrowband access system whereby to deliver ATM cells to a SDH/ATM trunk or to the adapter. The services comprising the narrowband system are terminated each by a respective adapter providing an individual virtual circuit connection to the multiplexed adapter. The narrowband services within that virtual circuit having permanently assigned time slots whereby to retain time slot sequence integrity throughout the adaptation process.

4 Claims, 5 Drawing Sheets for access aggregates of 6 or more channels no echo control is required

COMMUNICATIONS SYSTEM

This invention relates to digital communications systems and in particular to systems embodying asynchronous transfer mode (ATM) technology.

The asynchronous transfer mode (ATM) technology is a flexible form of transmission which allows any type of service traffic, voice, video or data, to be multiplexed together on to a common means of transmission. In order for this to be realised, the service traffic must first be adapted typically into 53 byte cells comprising 5 byte headers and 48 byte payloads such that the original traffic can be reconstituted at the far end of an ATM network. This form of adaptation is performed in the ATM adaptation layer (AAL). Five types of adaptation layer have been defined. This invention relates to adaptation layer 1 which is used to adapt constant bit rate traffic to the ATM standard.

The construction of a host interface for an ATM network is described in specification No. WO-A-92 22034. An arrangement for operating an asynchronous packet transmit bus is described in specification No. EP-A-0 523 874.

An ATM exchange may support POTS or ISDN services as well as B-ISDN services. The H320 Video conference standard is a typical user of an n×64 Kb/s service, this may well be embedded within a B-ISDN workstation and can also be supported by the N-ISDN. In an ATM exchange with 2 Mb/s trunk circuits with independent calls on each 64 kb/s channel it is desirable that traffic once adapted to ATM should remain in ATM up to the destination narrowband port. It is further desirable that a physical trunk at e.g. 155 Mb/s should be able to carry logical routes to more than one destination as 155 Mb/s is generally too large a capacity for trunking within a narrowband service network. If the logical routes are of n×64 kb/s where n≧6 then the cell assembly delay is reduced to the point that echo cancellation is no longer necessary. The cell assembly delay of a single 64 kb/s circuit is 6 msec which requires echo cancellation for interworking with the existing narrowband network.

According to the invention there is provided an integrated broadband and narrowband access arrangement, including a passive optical network, a multiplexed ATM adapter, an ATM core associated with the multiplexed adapter, wherein the ATM core terminates a broadband access system and a narrowband access system whereby to deliver ATM cells to a SDH/ATM trunk or to the adapter, wherein the narrow band access system comprises a plurality of line cards providing narrow band services which are connected to a common STM backplane, wherein the services comprising the narrowband system are terminated each by a respective adapter providing an individual virtual circuit connection to the multiplexed adapter, the narrowband services within that virtual circuit having permanently assigned timeslots whereby to retain timeslot sequence integrity throughout the adaptation process, wherein each said ATM adapter provides an interface between the backplane and the passive optical network, wherein the multiplexed adapter allows any channel within any virtual circuit to be connected to any channel on the backplane, and wherein the storing and distribution processes are controlled by a chain structure, each link in the chain comprising two bidirectional pointers and an address in the egress or ingress frame memory, there being one link per channel in each of the egress or ingress chains.

According to another aspect of the invention there is provided a method of transmitting traffic in an integrated broadband and narrowband access arrangement comprising a multiplexed ATM adapter and an ATM core associated with the multiplexed adapter, wherein the ATM core terminates a broadband access system and a narrowband access system whereby to deliver ATM cells to a SDH/ATM trunk or to the adapter, the method including terminating the services comprising the narrowband system each by a respective adapter providing an individual virtual circuit connection to the multiplexed adapter, and providing the narrowband services within that virtual circuit with permanently assigned timeslots whereby to retain timeslot sequence integrity throughout the adaptation process.

Our co-pending United Kingdom application No 9410294.4 S D Brueckheimer, R H Mauger 7-6) of even date relates to a flexible implementation of ATM adaptation layer 1. The present invention relates to the use of a multiplexed AAL1 adapter to enhance a flexible access system so that it can import both broadband and narrowband services in a flexible manner. In this context narrowband is understood to include services that are provided in a synchronous transfer mode (STM), typically channelled at 64 Kbit/sec, and broadband is understood to cover services which are provided by the asynchronous transfer mode (ATM). The bandwidths of the two services may overlap.

An embodiment of the invention will now be described with reference to the accompanying drawings in which.

Figure 1:
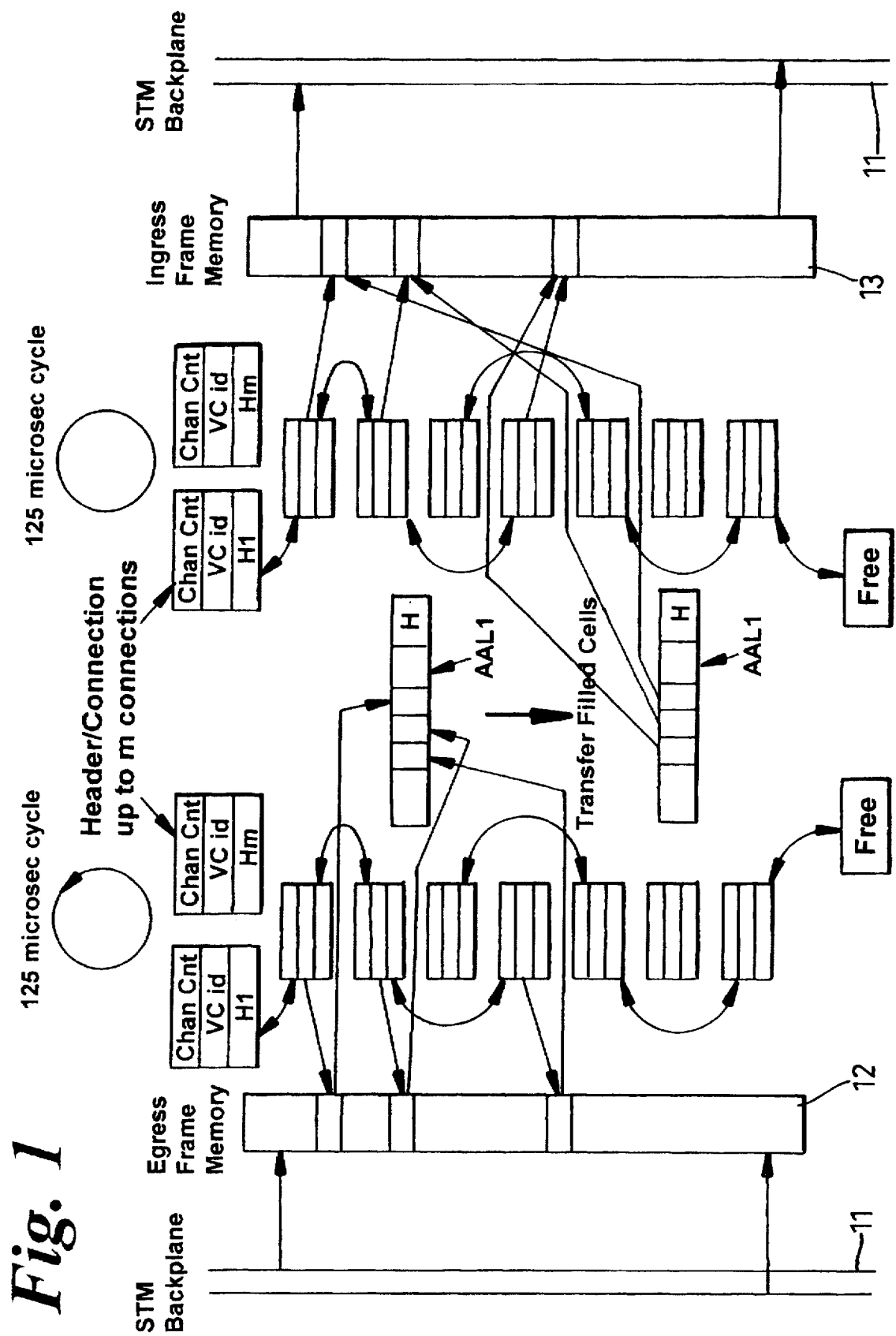
FIG. 1 is a schematic diagram of a flexible AAL1 processor.
Figure 2:
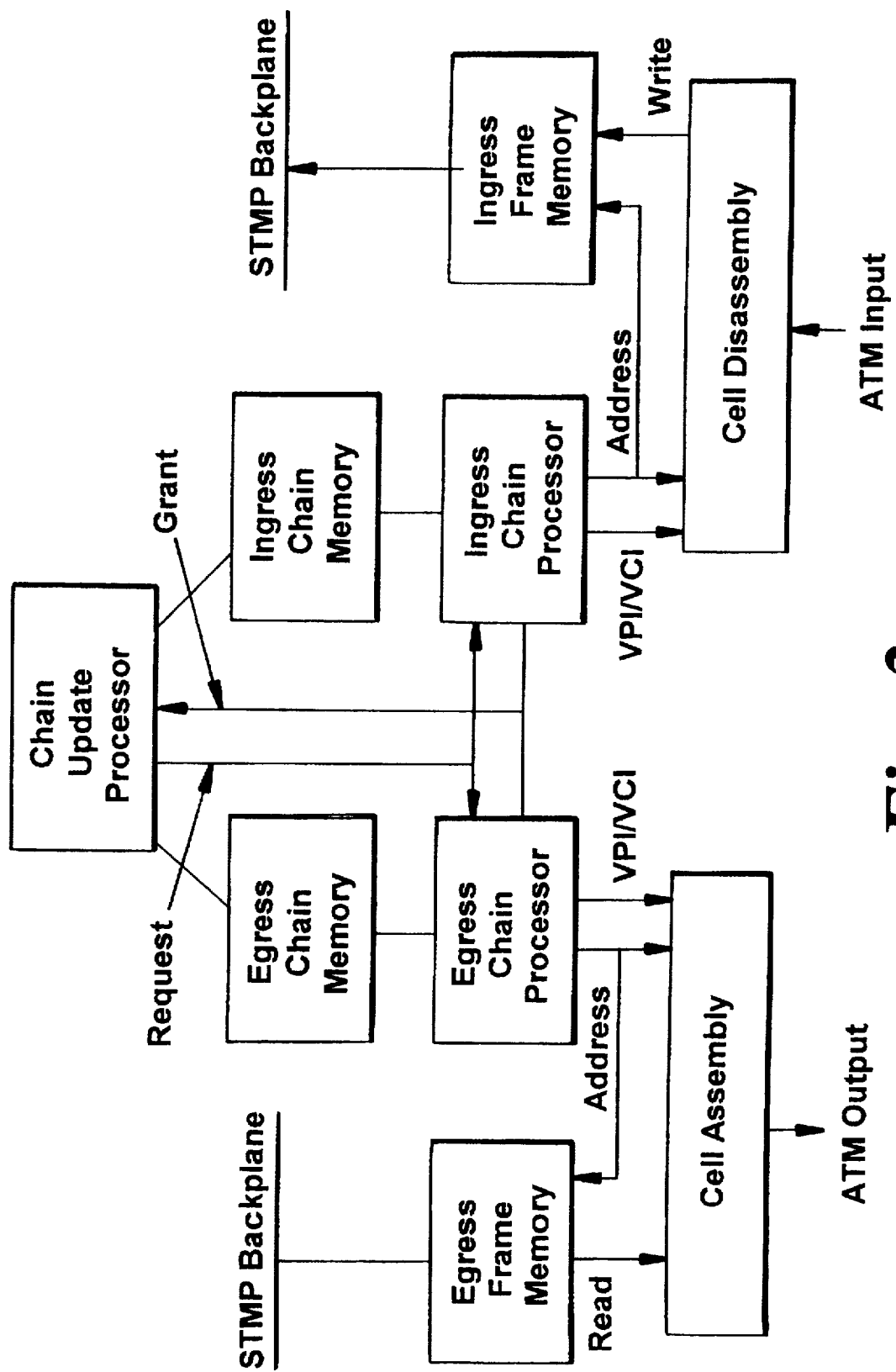
FIG. 2 is a block schematic diagram of the processor of FIG. 1.

FIGS. 1 and 2 together provide an illustration of the AAL1 implementation.

In a typical narrowband telecommunications system a common STM bus is available on the backplane of the equipment. This is used as the interface between the equipment which adapts external interfaces such as Analogue or ISDN lines and the equipment which performs the intrinsic function such as switching. An equipment which adapts to an external STM1 system would typically have 2048 64 Kb/s channels available on the backplane to the adaptation function. The purpose of the equipment is to allow the adaptation of a number of 64 Kb/s channels say 2048 into a number of n×64 Kb/s ATM virtual circuits and the readaptation to 64 Kb/s channels within the following constraints.

Any 64 Kb/s channels can be associated with any ATM virtual circuit.

Any group of P 64 Kb/s channels can be assembled together as part or whole of an ATM virtual circuit and will maintain timeslot sequence integrity through the adaptation and transmission processes.

For conformance to AAL1 standards n is restricted to values from 1 to 30 for proprietary applications n can have any value up to the full capacity of the system.

The number of ATM virtual circuits m can be any value up to the limit of 1 64 Kb/s circuit per ATM VC i.e. 1≦M≦2048 for this example.

The principle of the mechanism is illustrated in FIG. 1 and the functional block diagram or flow chart of its implementation is illustrated in FIG. 2. In both diagrams a process is implied, but not shown, which runs at e.g. 125 microsecond intervals and staticises the STM stream on the backplane 11 into an egress frame memory and takes the contents of an Ingress frame memory and distributes this as an STM stream to the backplane. The mechanism illustrated in FIG. 2 is controlled by a chain structure. Each link in the chain is embodied as a combination of two bidirectional pointers and an address in the egress or ingress frame memory, there is one link for each 64 Kb/s channel in each of the egress and ingress chains. Chains are linked to headers and there is one header for each potential n×64 Kb/s ATM virtual circuit, headers are embodied by the association of a channel count for control purposes, a VC identity for cell assembly purposes and a bi-directional pointer to the first link of the chain. A chain is assembled for each active ATM virtual circuit and consists of a number of links which use bi-directional pointers to point upwards to the header or previous link and downwards to the next link. Each link contains the address in the frame memory of the required frame sample; links which have not been allocated are formed into a chain which is formed under a special FREE header.

Separate egress and ingress chain processes are initiated each 125 microsecond cycle. These process each chain in turn and each link in the chain in turn and deliver an address to the voice memory and a VPI/VCI to a cell assembly or disassembly process. For the cell assembly process the frame samples are read at each address and change and placed in the next available byte position within the cell payload. Filled cells are assembled with their ATM Header and AAL1 SAT-PDU header and launched into the ATM. A new cell is then generated for that virtual circuit.

For the cell disassembly process cells are unpacked a byte at a time and frame samples are written to the ingress frame memory 13 according to the address delivered by the ingress chain processor, on receipt of an indication from the AAL1 of the boundary of an n×64 Kb/s frame. The cell disassembly process then checks for phase synchronism between egress and ingress functions. The chains are updated under control of a chain update processor under instructions from the system control (not shown). The chain update processor operates a request/grant mechanism with the chain processors to ensure that a chain is not being modified at the same time as it is being processed. If an independent 64 Kb/s channel is being modified then it can be inserted or deleted from any point in the chain. An insertion process uses a link from the FREE chain. A deletion process returns a link to the FREE chain. If a P×64 Kb/s service is being set up then the channels must be inserted in the correct order in consecutive links in the chain.

Figure 3:
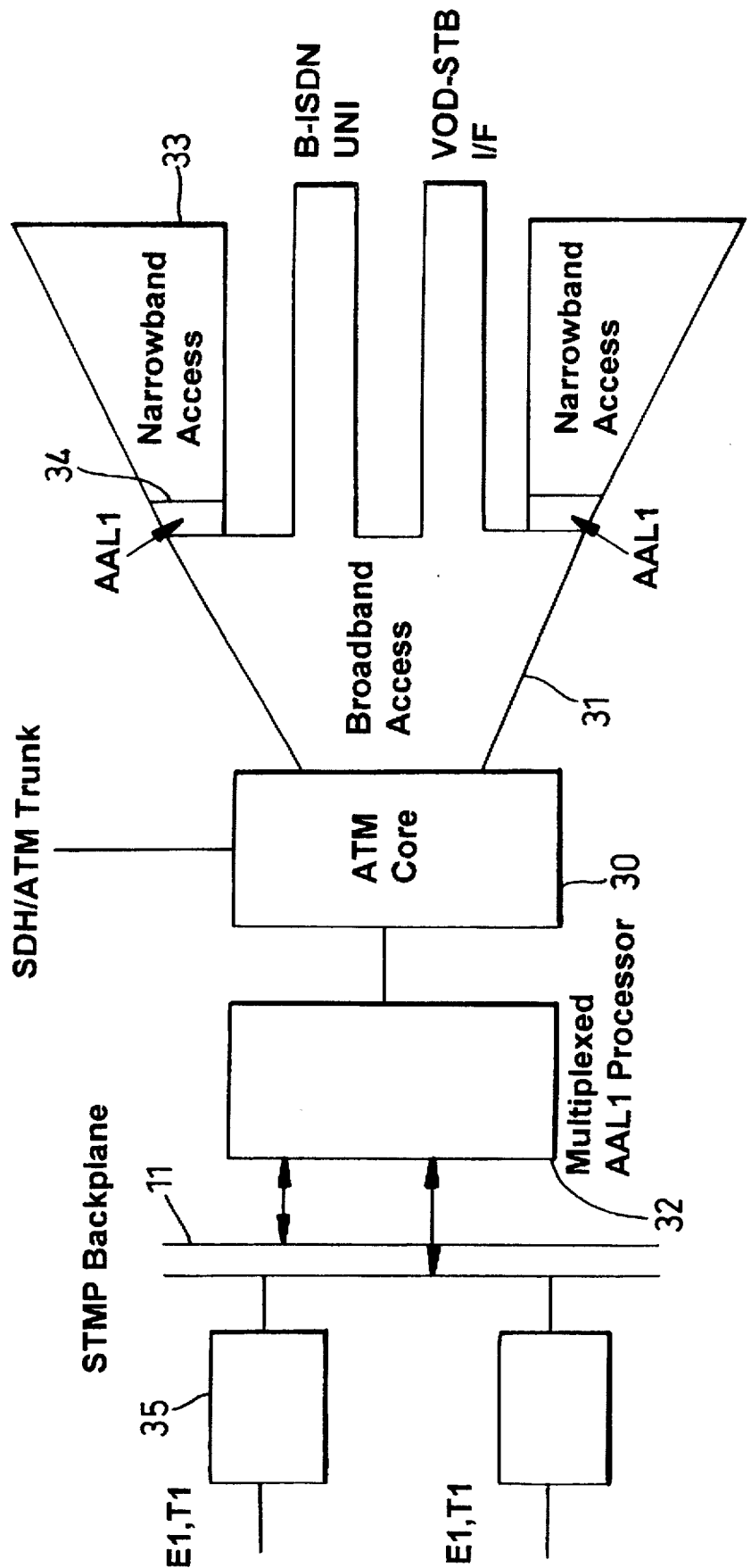
FIG. 3 is a schematic diagram of a multiplexed ATM adapter according to the invention.

An embodiment of the invention is illustrated in FIG. 3. The core of the system is an ATM processor 30 which is able to terminate a broadband access system 31 and deliver ATM cells to a SDH/ATM trunk or to a multiplexed AAL1 processor 32 as described above. Broadband access systems may be based on ATM PONs fibre/coax hybrid networks or other well known access technologies. Attached to the broadband access system are one or more narrowband access systems 33 which deliver services in a 64 Kb/s channelised mode. The interface between the narrowband access and broadband access is provided by an AAL1 adapter 34 and in particular a n×64 Kb/s structured data transfer variant of AAL1. Narrowband access systems may be PONs, radio or other well known access technologies. The multiplexed AAL1 processor interfaces to STM backplane 11 to which are attached adaptation, devices 35 to channelised trunk systems such as the 2 Mb/s E1 trunk or the 1.5 Mb/s T1 trunk system. This arrangement provides flexible interworking of circuits within the narrowband access domain and channels within the external channelised trunks, this being achieved by the multiplexed AAL1 system providing an implicit grooming or cross-connection function.

Figure 4:
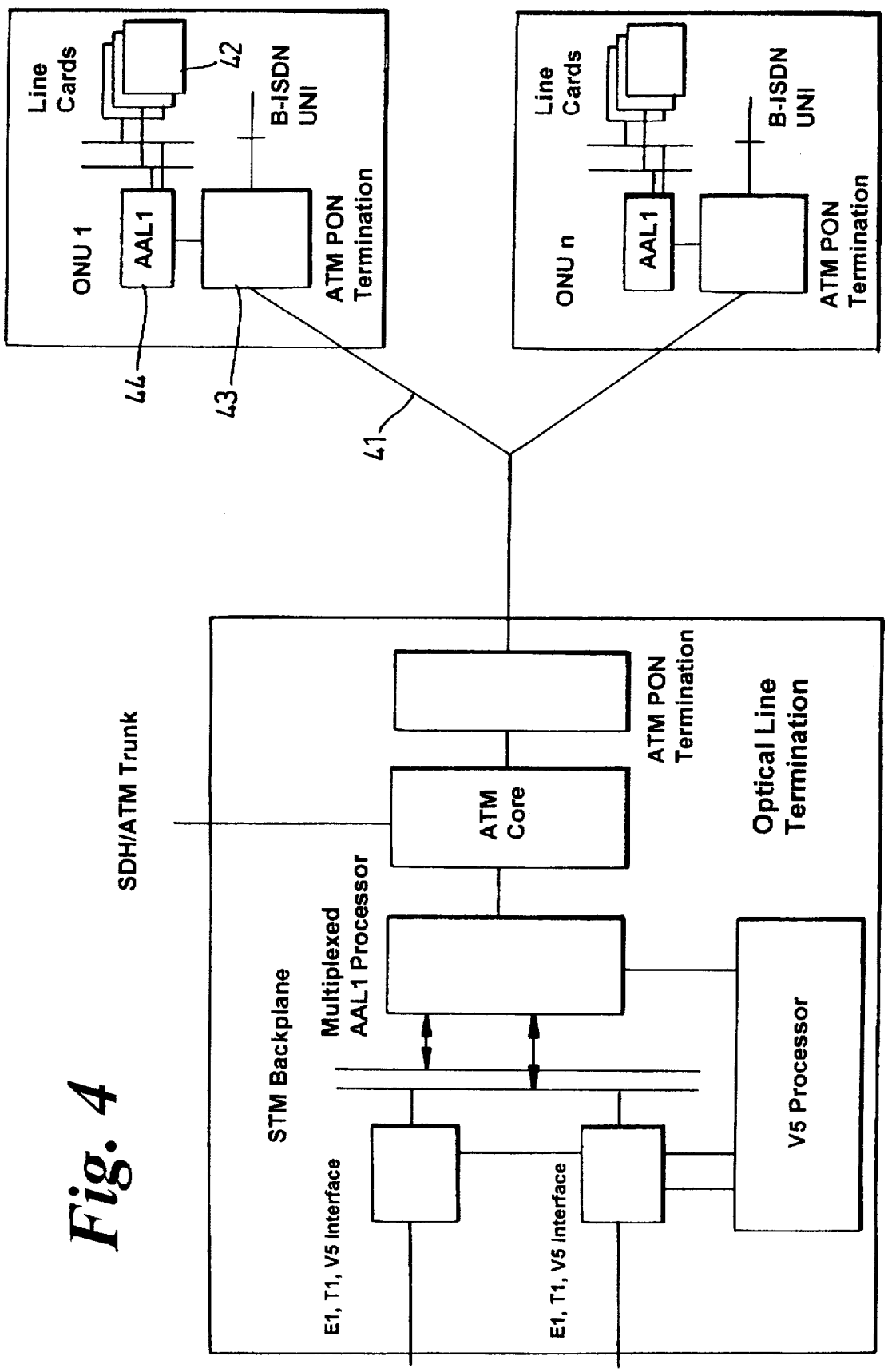
FIG. 4 illustrates an implementation of the system of FIG. 3 using an ATM passive optical network.
Figure 5:
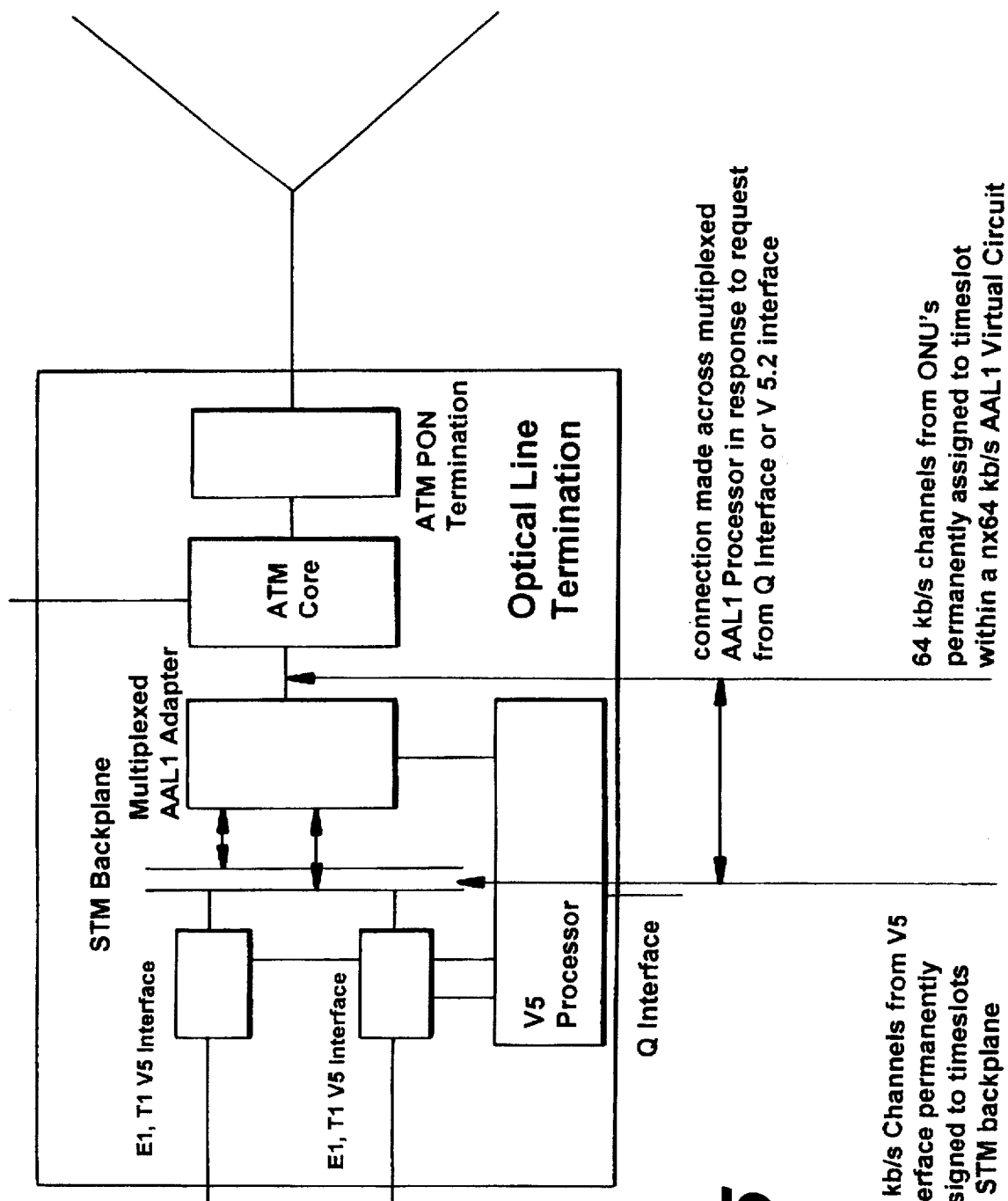
FIG. 5 illustrates the interworking of individual AAL1 adapters and the multiplexed adapter of FIG. 3.

An example implementation of the concept is illustrated in FIG. 4. This shows an ATM passive optical network 41 (PON) as the broadband access system. The narrowband access system may be a collection of line cards 42 providing narrowband services which are connected to a common STM backplane within the optical network unit (ONU) that houses the ATM PON termination 43. An AAL1 adapter 44 provides the interface between the STM backplane and the ATM PON termination. The arrangement described herein relates to the interworking between the individual AAL1 adapters in the ONUs and the multiplexed AAL1 adapter in the optical line termination. This interaction is illustrated in FIG. 5. Each individual AAL1 adapter in the ONUs has a separate virtual circuit connection to the multiplexed AAL1 adapter in the optical line termination. Within that virtual circuit, narrowband services connected in the ONUs are permanently assigned timeslots within the n×64 Kb/s AAL1 structure. These may be individual 64 Kb/s channels or P×64 Kb/s channels supporting timeslot sequence integrity. The channelised trunks are terminated in the standard manner and their channels are presented in permanently assigned positions on the STM backplane of the optical line termination. The operation of flexible access systems is standardised by two interface standards, the Q interface standard which allows the system to be configured from a network management system and the V 5 interface which in the V 5.2 version allows channels connecting to a switch to be dynamically configured on a per call basis. This is implemented using eg the bearer channel connection protocol in V 5.2.

The multiplexed AAL1 adapter allows any channel within any virtual circuit to be connected to any channel on the backplane either under request from the Q interface or from the V 5.2 interface. It therefore emulates the operation of a cross-connect or a switch which is required in conventional implementations. With reference to FIG. 1, when a new ONU is configured by operation over the Q interface, then a virtual circuit is configured between the AAL1 adapter in the ONU and the multiplexed AAL1 adapter. This is embodied by establishing a new chain with a link for each configured channel at the ONU. At this point the channels on the channelised trunks have not been assigned so the links in the chain are populated with default addresses in the frame memory such that no connection takes place. As channels are assigned on the V 5 interface whether by the Q interface or the V 5.2 interface, then the default address in the chain links is updated to the real assigned address.

We claim:

1. An integrated broadband and narrowband access arrangement for facilitating narrowband access to an ATM network, the arrangement comprising a multiplexed ATM adapter, and an ATM core coupled to the multiplexed adapter, wherein the ATM core terminates a broad band access system comprising a passive optical network and a narrowband access system so as to deliver ATM cells to the adapter, wherein the narrowband access system comprises a plurality of line cards providing narrowband services which line cards are each connected to a common synchronous transport mode STM backplane interfaced to the ATM core via a multiplexed adaptation layer processor, said backplane being associated with an egress frame memory for storing an STM stream and an ingress frame memory from which a stored STM stream is distributed to said backplane, wherein the services delivered by the narrowband system are terminated each by a respective adapter providing an individual virtual circuit connection to the multiplexed adapter, the narrowband services within that virtual circuit being allocated permanently assigned timeslots so as to retain timeslot integrity throughout the adaptation process, wherein each said ATM adapter provides an interface between the STM backplane and the passive optical network, wherein the multiplexed adapter allows any channel within any virtual circuit to be connected to any channel on the STM backplane, and wherein the storing and distribution processes are controlled by a chain structure comprising a plurality of links, there being one link per channel, each link in the chain comprising two bidirectional pointers to the previous and successive links respectively and an address in the egress or the ingress frame memory.

2. An integrated broadband and narrowband access arrangement as claimed in claim 1, and incorporating means for storing a synchronous transport mode (STM) steam into the egress memory, and means for distributing the content of the ingress memory to the backplane as an STM stream.

3. An integrated broad band and narrow band access arrangement as claimed in claim 2, wherein each said chain is linked to a header, there being one said header for each potential ATM virtual circuit.

4. A method of switching traffic in an integrated broadband and narrowband access arrangement for facilitating narrowband access to an ATM network, the access arrangement comprising a multiplexed ATM adapter, and an ATM core coupled to the multiplexed adapter, wherein the ATM core terminates a broad band access system comprising a passive optical network and a narrowband access system so as to deliver ATM cells to the adapter, and wherein the narrowband access system comprises a plurality of line cards providing narrowband services which line cards are each connected to a common synchronous transport mode (STM) backplane interfaced to the ATM core via a multiplexed adaptation layer processor, said backplane being associated with an egress frame memory for storing an STM stream and an ingress frame memory from which a stored STM stream is distributed to said backplane, the method including terminating the services provided by the narrowband access system each by a respective adapter providing an individual virtual circuit connection to the multiplexed adapter, and providing the narrowband services within that virtual circuit with permanently assigned timeslots so as to retain timeslot integrity throughout the adaptation process, and wherein the storing and distribution processes are controlled by a chain structure comprising a plurality of links, there being one link per channel, each link in the chain comprising two bidirectional pointers to the previous and successive links respectively and an address in the egress or the ingress frame memory.

* * * * *